US012806855B2

(12) United States Patent
Olubummo et al.

(10) Patent No.: US 12,806,855 B2
(45) Date of Patent: Nov. 24, 2026

(54) THREE-DIMENSIONAL PRINTING

(71) Applicant: PERIDOT PRINT LLC, Palo Alto, CA (US)

(72) Inventors: Adekunle Olubummo, Palo Alto, CA (US); Lihua Zhao, Palo Alto, CA (US); Aja Hartman, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 255 days.

(21) Appl. No.: 18/527,120

(22) Filed: Dec. 1, 2023

(65) Prior Publication Data

US 2024/0116242 A1 Apr. 11, 2024

Related U.S. Application Data

(63) Continuation of application No. 17/047,720, filed as application No. PCT/US2018/052327 on Sep. 22, 2018, now Pat. No. 11,833,750.

(51) Int. Cl.
*B29C 64/165* (2017.01)
*B29C 64/268* (2017.01)
(Continued)

(52) U.S. Cl.
CPC .......... *B29C 64/165* (2017.08); *B29C 64/268* (2017.08); *B33Y 10/00* (2014.12);
(Continued)

(58) Field of Classification Search
CPC ..... B29C 64/165; B29C 64/268; B33Y 10/00; B33Y 30/00; B33Y 70/00; C08K 5/17;
(Continued)

(56) References Cited

U.S. PATENT DOCUMENTS 3,923,924 A 12/1975 Wells et al.
9,096,759 B2 8/2015 Wagman et al.
(Continued)

FOREIGN PATENT DOCUMENTS

CN 101080329 A 11/2007
CN 103756293 A 4/2014
(Continued)

OTHER PUBLICATIONS

Fujihashi et al., WO2018012643 A1 machine translation in English, Apr. 25, 2019. (Year: 2019).*
(Continued)

*Primary Examiner* — David T Karst
(74) *Attorney, Agent, or Firm* — Dierker & Kavanaugh, P.C.

(57) ABSTRACT

An example of a three-dimensional (3D) printing kit includes a build material composition, an epoxy agent to be applied to at least a portion of the build material composition during 3D printing, and a fusing agent to be applied to the at least the portion of the build material composition during 3D printing. The build material composition includes a polyamide having an amino functional group. The epoxy agent includes an epoxy having an epoxide functional group to react with the amino functional group of the polyamide in the at least the portion. The fusing agent includes an energy absorber.

18 Claims, 3 Drawing Sheets

(51) Int. Cl.

| | |
|---|---|
| ***B29K 63/00*** | (2006.01) |
| ***B29K 77/00*** | (2006.01) |
| ***B29K 105/24*** | (2006.01) |
| ***B33Y 10/00*** | (2015.01) |
| ***B33Y 30/00*** | (2015.01) |
| ***B33Y 70/00*** | (2020.01) |
| ***C08K 5/17*** | (2006.01) |
| ***C08L 63/00*** | (2006.01) |
| ***C08L 77/04*** | (2006.01) |
| *B29K 105/00* | (2006.01) |

(52) U.S. Cl.

CPC ............... *B33Y 30/00* (2014.12); *B33Y 70/00* (2014.12); *C08K 5/17* (2013.01); *C08L 63/00* (2013.01); *C08L 77/04* (2013.01); *B29K 2063/00* (2013.01); *B29K 2077/00* (2013.01); *B29K 2105/0032* (2013.01); *B29K 2105/24* (2013.01)

(58) Field of Classification Search

CPC . C08L 63/00; C08L 77/04; B29K 2105/0032; B29K 2105/24; B29K 2063/00; B29K 2077/00

USPC .......................................................... 523/402

See application file for complete search history.

(56) References Cited

U.S. PATENT DOCUMENTS

| | | | | |
|---|---|---|---|---|
| 11,591,494 | B2 | 2/2023 | Olubummo et al. | |
| 2004/0036200 | A1 | 2/2004 | Patel et al. | |
| 2005/0014005 | A1 | 1/2005 | Kramer et al. | |
| 2006/0173141 | A1 | 8/2006 | Ando et al. | |
| 2007/0120921 | A1 | 5/2007 | Carlini et al. | |
| 2007/0241482 | A1 | 10/2007 | Giller et al. | |
| 2008/0090169 | A1 | 4/2008 | Eveson et al. | |
| 2013/0030124 | A1 | 1/2013 | Tomoi | |
| 2014/0058013 | A1 | 2/2014 | Wang et al. | |
| 2014/0141168 | A1 | 5/2014 | Rodgers | |
| 2016/0177078 | A1* | 6/2016 | Naito | C08L 67/02 525/190 |
| 2016/0244628 | A1 | 8/2016 | Breton et al. | |
| 2017/0036403 | A1 | 2/2017 | Ruff et al. | |
| 2017/0253751 | A1* | 9/2017 | Busbee | C09D 175/06 |
| 2018/0243978 | A1 | 8/2018 | Nguyen et al. | |
| 2018/0258559 | A1 | 9/2018 | Dadmun et al. | |
| 2019/0039293 | A1 | 2/2019 | Liu et al. | |
| 2019/0048188 | A1 | 2/2019 | Jogikalmath et al. | |
| 2019/0240938 | A1 | 8/2019 | Von et al. | |
| 2020/0339810 | A1 | 10/2020 | Fillot | |
| 2021/0016499 | A1 | 1/2021 | Olevsky et al. | |
| 2021/0024417 | A1 | 1/2021 | Thompson et al. | |

FOREIGN PATENT DOCUMENTS

| | | | | |
|---|---|---|---|---|
| CN | 105229060 | A | 1/2016 | |
| CN | 105778423 | A | 7/2016 | |
| CN | 105907043 | A | 8/2016 | |
| CN | 106147376 | A * | 11/2016 | C04B 28/14 |
| CN | 107548347 | A | 1/2018 | |
| EP | 3311994 | A1 | 4/2018 | |
| JP | 2005-035299 | A | 2/2005 | |
| KR | 10-1831819 | B1 | 2/2018 | |
| WO | 2014/184351 | A1 | 11/2014 | |
| WO | 2015/080059 | A1 | 6/2015 | |
| WO | 2016/124432 | A1 | 8/2016 | |
| WO | 2017/014785 | A1 | 1/2017 | |
| WO | WO-2017014784 | A1 * | 1/2017 | B29C 64/153 |
| WO | 2017/046132 | A1 | 3/2017 | |
| WO | 2017/184135 | A1 | 10/2017 | |
| WO | 2017/184136 | A1 | 10/2017 | |
| WO | 2017/188943 | A1 | 11/2017 | |
| WO | 2017/196330 | A1 | 11/2017 | |
| WO | 2017/196361 | A1 | 11/2017 | |
| WO | 2018/012643 | A1 | 1/2018 | |
| WO | 2018/115767 | A1 | 6/2018 | |
| WO | 2018/144054 | A1 | 8/2018 | |
| WO | 2018/167067 | A1 | 9/2018 | |

OTHER PUBLICATIONS

Zhang et al., CN 106147376 A machine translation in English, Nov. 23, 2016. (Year: 2016).*

Annex "N-AMINOETHYLPIPERAZINE" in Handbook of Plastics, vol. 2, edited by V. Kataev et al., Moscow Publishing House "Chemistry", 1975, p. 216, 217.

Deshpande, Anushree, "Synthesis and Characterization of in-situ Nylon-6/Epoxy Blends" (Thesis), University of Cincinnati, Aug. 31, 2016, 119 pages.

Machine translation of WO 2018/012643 A1 (Fujihashi, 2018).

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
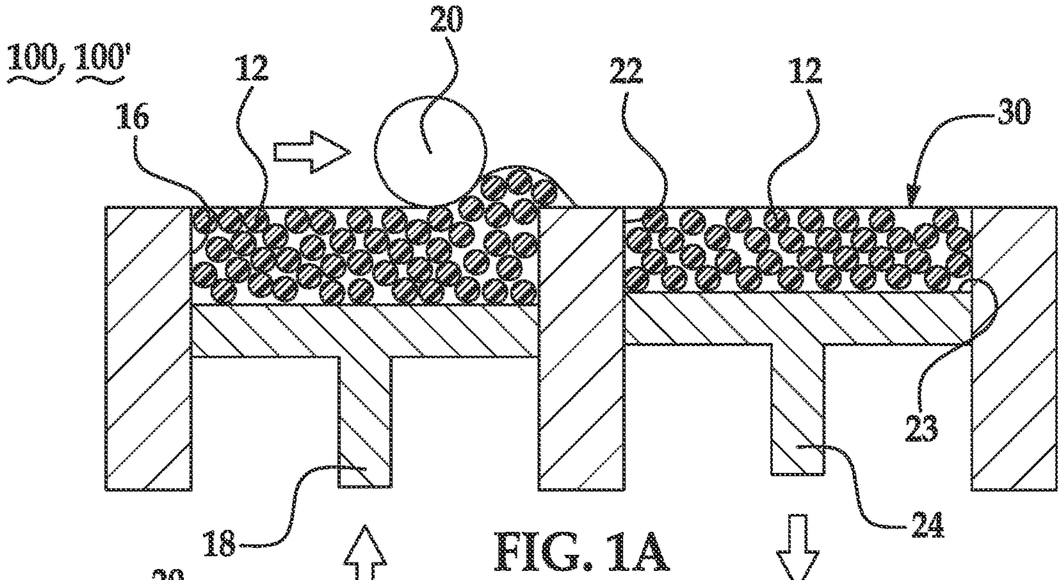
FIGS. 1A through 1C are schematic and partially cross-sectional views depicting the formation of a layer of a 3D object using examples of the 3D printing kit and examples of the 3D printing methods disclosed herein.

In some examples disclosed herein, a build material composition including a polyamide, which has an amino functional group, is utilized with an epoxy agent including an epoxy, which has an epoxide functional group. In a three-dimensional (3D) printing process disclosed herein, the epoxy agent may be selectively applied on at least a portion of the build material composition. In these examples, the epoxide functional group of the epoxy may react with the amino functional group of the polyamide to form a thermoset composition in the at least the portion. The thermoset composition may become a layer of a 3D object.

In some other examples disclosed herein, an epoxy agent, an amine agent including an amine, and a fusing agent are utilized with a build material composition including a polyamide or a polyolefin. In a three-dimensional (3D) printing process disclosed herein, each of the epoxy agent, the amine agent, and the fusing agent may be selectively applied on at least a portion of the build material composition. In these examples, the fusing agent may absorb radiation to which the build material is exposed and cause the polymer in the at least portion to fuse/coalesce. Fusing/coalescing causes the polymer to join or blend to form a single entity and may involve at least partial thermal merging, melting, binding, and/or some other mechanism that coalesces the polymer. Also in these examples, the epoxide functional group of the epoxy of the epoxy agent may react with the amine of the amine agent to form a composite within the matrix of the fused/coalesced polymer. In these examples, the matrix of the polymer and the composite therein may become a layer of a 3D object.

It has been found that 3D objects formed by using the epoxy agent disclosed herein have increased ultimate tensile strength and decreased elongation at break (a more rigid and less ductile part) as compared to 3D objects formed without the epoxy agent. Additionally, it is believed that 3D objects formed by using the epoxy agent disclosed herein have increased thermal stability and higher heat deflection temperatures as compared to 3D objects formed without the epoxy agent. It is believed that the increased thermal stability and higher heat deflection temperatures may be due, at least in part, to the thermosetting nature of the thermoset composition or composite formed.

Throughout this disclosure, a weight percentage that is referred to as "wt % active" refers to the loading of an active component of a dispersion or other formulation that is present in the epoxy agent, amine agent, and/or fusing agent. For example, an energy absorber, such as carbon black, may be present in a water-based formulation (e.g., a stock solution or dispersion) before being incorporated into the fusing fluid. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the epoxy agent, amine agent, or fusing agent) of a 100% active component that does not include other non-active components therein, or ii) the loading (in the epoxy agent, amine agent, or fusing agent) of a material or component that is used "as is" and thus the wt % accounts for both active and non-active components.

3D Printing Kits, Multi-Fluid Kits, and Compositions

Disclosed herein is a three-dimensional (3D) printing kit including a build material composition and an epoxy agent to be applied to at least a portion of the build material composition during 3D printing.

In an example, the three-dimensional (3D) printing kit or composition, comprises: a build material composition including a polyamide having an amino functional group; an epoxy agent to be applied to at least a portion of the build material composition during 3D printing, the epoxy agent including an epoxy having an epoxide functional group to react with the amino functional group of the polyamide in the at least the portion; and a fusing agent to be applied to the at least the portion of the build material composition during 3D printing, the fusing agent including an energy absorber. The fluids of this 3D printing kit may also be part of a multi-fluid kit for 3D printing.

In another example, the three-dimensional (3D) printing kit or composition, comprises: a build material composition including a polyamide having an amino functional group, the build material composition being devoid of an adhesive; and an epoxy agent to be applied to at least a portion of the build material composition during 3D printing, the epoxy agent including an epoxy and an aqueous vehicle, the epoxy having an epoxide functional group to react with the amino functional group of the polyamide in the at least the portion. The fluids of this 3D printing kit may also be part of a multi-fluid kit for 3D printing.

In still another example, a multi-fluid kit for three-dimensional (3D) printing, comprises: an epoxy agent to be applied to at least a portion of the build material composition during 3D printing; and an amine agent including an amine selected from the group consisting of aniline sulfonamide, tetraethylenepentamine, dipropylenediamine, diethylaminopropylamine, N-aminoethylpiperazine, bis(2-ethylhexyl) amine, methanediamine, methylphenylenediamine, diaminodiphenylsulfone, and a combination thereof, the amine agent to be applied to the at least the portion of the build material composition during 3D printing. In some examples, this multi-fluid kit may be similar to the 3D printing kits, in that it further comprises a dry component, wherein the dry component is the build material composition including a polymer selected from the group consisting of a polyamide, a polyolefin, and a combination thereof.

In some examples, the 3D printing kit or composition consists of the build material composition and the epoxy agent with no other components. In other examples, the 3D printing kit or composition includes additional components, such as a fusing agent, an amine agent, or a combination thereof. In still other examples, the 3D printing kit or composition consists of the build material composition, the epoxy agent, and the fusing agent with no other components. In yet other examples, the multi-fluid kit consists of the epoxy agent and the amine agent with no other components. In yet further examples, the multi-fluid kit consists of the epoxy agent, the amine agent, and the fusing agent with no other components. The components of the 3D printing kit or composition and/or of the multi-fluid kit may be maintained separately until used together in examples of the 3D printing method disclosed herein.

Example compositions of the build material composition, the epoxy agent, the amine agent, and the fusing agent that are suitable for use in examples of the 3D printing kit or composition are described below.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Build Material Compositions

In the examples of the 3D printing kit, the 3D printing composition, the 3D printing methods, and the 3D printing system disclosed herein, a build material composition may be used.

In some examples, the build material composition includes a polyamide. In some of these examples, the build material composition consists of the polyamide without any other components. In others of these examples, the build material composition may include additional components, such as glass a filler, an antioxidant, a whitener, an antistatic agent, a flow aid, or a combination thereof, with the polyamide.

The polyamide may be any polyamide, which has an amino functional group. In examples of the kit or composition disclosed herein, the polyamide is selected from the group consisting of polyamide 11 (PA 11/nylon 11), polyamide 12 (PA 12/nylon 12), polyamide 12-GB (PA 12-GB/nylon 12-GB), polyamide 6 (PA 6/nylon 6), polyamide 13 (PA 13/nylon 13), polyamide 6,13 (PA 6,13/nylon 6,13), polyamide 8 (PA 8/nylon 8), polyamide 9 (PA 9/nylon 9), polyamide 66 (PA 66/nylon 66), polyamide 612 (PA 612/nylon 612), polyamide 812 (PA 812/nylon 812), polyamide 912 (PA 912/nylon 912), and a combination thereof. It is to be understood that polyamide 12-GB refers to a polyamide 12 including glass beads or another form of glass disclosed herein (mixed therewith or encapsulated therein, e.g., at a weight ratio of the glass to the polyamide 12 within the ranges set forth herein).

In some examples, the polyamide may be in the form of a powder. In other examples, the polyamide may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polyamide may be made up of similarly sized particles and/or differently sized particles. In an example, the average particle size of the polyamide ranges from about 2 μm to about 200 μm. In another example, the average particle size of the polyamide ranges from about 10 μm to about 110 μm. In still another example, the average particle size of the polyamide ranges from about 20 μm to about 100 μm. The term "average particle size", as used herein, may refer to a number-weighted mean diameter or a volume-weighted mean diameter of a particle distribution.

The polyamide may have a wide processing window of greater than 5° C., which can be defined by the temperature range between the melting point and the re-crystallization temperature. As examples, the polyamide may have a melting point ranging from about 225° C. to about 250° C., from about 155° C. to about 215° C., about 160° C. to about 200° C., from about 170° C. to about 190° C., or from about 182° C. to about 189° C. As another example, the polyamide may have a melting point of about 180° C.

In some examples, the polyamide does not substantially absorb radiation having a wavelength within the range of 400 nm to 1400 nm. In other examples, the polyamide does not substantially absorb radiation having a wavelength within the range of 800 nm to 1400 nm. In still other examples, the polyamide does not substantially absorb radiation having a wavelength within the range of 400 nm to 1200 nm. In these examples, the polyamide may be considered to reflect the wavelengths at which the polyamide does not substantially absorb radiation. The phrase "does not substantially absorb" means that the absorptivity of the polyamide at a particular wavelength is 25% or less (e.g., 20%, 10%, 5%, etc.).

In some examples, the polyamide may also include glass therein (e.g., when the polyamide is a polyamide 12-GB). In some of these examples, the glass may be dry blended with the polyamide. In others of these examples, the glass may be encapsulated by the polyamide. When the glass is encapsulated by the polyamide, the polyamide may form a continuous coating (i.e., none of the glass is exposed) or a substantially continuous coating (i.e., 5% or less of the glass is exposed) on the glass.

Whether the glass is dry blended with the polyamide or encapsulated by the polyamide may depend, in part, on (i) the characteristics of the glass, and (ii) the 3D printer with which the build material composition is to be used. As an example, when the glass includes glass fibers and/or crushed glass, the glass may be encapsulated by the polyamide. As another example, when segregation of dry blended polyamide and glass may occur and cause damage to the 3D printer in which the build material composition is to be used, the glass may be encapsulated by the polyamide.

When the glass is dry blended with the polyamide, the average particle size of the glass may range from about 5 μm to about 100 μm.

When the glass is encapsulated by the polyamide, the average particle size of the glass (prior to being coated) may range from about 5 μm to about 100 μm or from about 30 μm to about 50 μm. The average particle size of the encapsulated material (i.e., the glass coated with the polyamide) may depend upon the size of the glass prior to coating and the thickness of the polyamide that is applied to the glass. In an example, the average particle size of the encapsulated build material may range from about 10 μm to about 200 μm. In another example, the average particle size of the encapsulated build material may range from about 20 μm to about 120 μm.

The weight ratio of the glass to the polyamide (e.g., polyamide 12) may range from about 5:95 to about 60:40. In some examples, the weight ratio of the glass to the polyamide may range from about 10:90 to about 60:40; or from about 20:80 to about 60:40; or from about 40:60 to about 60:40; or from about 5:95 to about 40:60; or from about 5:95 to about 50:50. In some instances, additives (e.g., antioxidant(s), whitener(s), antistatic agent(s), flow aid(s), etc.) may be included with the polyamide and glass. In these instances, the weight of the polyamide, for the purpose of determining the weight ratio of the glass to the polyamide, may include the weight of the additives in addition to the weight of the polymer. In other instances, the weight of the polyamide, for the purpose of determining the weight ratio of the glass to the polyamide, includes the weight of the polymer alone (whether or not additives are included in the build material composition). The weight ratio of the glass to the polyamide may depend, in part, on the desired properties of the 3D object to be formed, the glass used, the polyamide used, and/or the additives included in the polyamide.

In one example, the glass may be selected from the group consisting of solid glass beads, hollow glass beads, porous glass beads, glass fibers, crushed glass, and a combination thereof. In another example, the glass may be selected from the group consisting of soda lime glass ($Na_2O/CaO/SiO_2$), borosilicate glass, phosphate glass, fused quartz, and a combination thereof. In still another example, the glass may be selected from the group consisting of soda lime glass, borosilicate glass, and a combination thereof. In yet other examples, the glass may be any type of non-crystalline silicate glass.

In some examples, a surface of the glass may be modified with a functional group selected from the group consisting of an acrylate functional silane, a methacrylate functional silane, an epoxy functional silane, an ester functional silane, an amino functional silane, and a combination thereof. Examples of the glass modified with such functional groups and/or such functional groups that may be used to modify the glass are available from Potters Industries, LLC (e.g., an epoxy functional silane or an amino functional silane), Gelest, Inc. (e.g., an acrylate functional silane or a methacrylate functional silane), Sigma-Aldrich (e.g., an ester functional silane), etc. In an example, the surface of the glass is modified with an amino functional silane. In another example, the surface of the glass may be modified with an epoxy functional silane. In other examples, a surface of the glass is not modified with any functional group.

In some examples, the build material composition, in addition to the polyamide (and in some instances the glass), may include a filler, an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Filler(s) may be added to the build material composition to modify the properties of the 3D parts to be printed. Examples of suitable fillers include alumina, silica, talc, and a combination thereof. In an example, the filler may be included in the build material composition in an amount ranging from about 1 wt % to about 60 wt %, based on the total weight of the build material composition.

Antioxidant(s) may be added to the build material composition to prevent or slow molecular weight decreases of the polyamide and/or may prevent or slow discoloration (e.g., yellowing) of the polyamide by preventing or slowing oxidation of the polyamide. In some examples, the antioxidant may discolor upon reacting with oxygen, and this discoloration may contribute to the discoloration of the build material composition. The antioxidant may be selected to minimize this discoloration. In some examples, the antioxidant may be a radical scavenger. In these examples, the antioxidant may include IRGANOX® 1098 (benzenepropanamide, N,N-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polyamide. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

In some other examples of the 3D printing kit or composition and/or as a dry component of a multi-fluid kit, the build material composition includes a polymer selected from the group consisting of a polyamide, a polyolefin, and a combination thereof. Whether the polyamide and/or the polyolefin is/are selected, some examples of the build material composition consist of the desirable polymer(s) without any other components. In others of these examples, the build material composition may include additional components, such as the glass the filler, the antioxidant, the whitener, the antistatic agent, the flow aid, or a combination thereof, in addition to the desirable polymer(s).

In these examples, one of: i) the polymer is the polyamide and the polyamide is selected from the group consisting of polyamide 11, polyamide 12, polyamide 12-GB, polyamide 6, polyamide 13, polyamide 6,13, polyamide 8, polyamide 9, polyamide 66, polyamide 612, polyamide 812, polyamide 912, and a combination thereof; or the polymer is the polyolefin and the polyolefin is selected from the group consisting of polypropylene, polyethylene, and a combination thereof; or ii) the polymer is the polyolefin and the polyolefin is selected from the group consisting of polypropylene, polyethylene, and a combination thereof. It is to be understood that when the polymer is the polyamide, the polyamide may be any of the examples described above. It is also to be understood that when the polymer is the polyolefin, the polyolefin may be any polyolefin as described below.

In some examples, the polyolefin may be in the form of a powder. In other examples, the polyolefin may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polyolefin may be made up of similarly sized particles and/or differently sized particles. In an example, the average particle size of the polyolefin ranges from about 2 μm to about 200 μm. In another example, the average particle size of the polyolefin ranges from about 10 μm to about 110 μm. In still another example, the average particle size of the polyolefin ranges from about 20 μm to about 100 μm. As mentioned above, the term "average particle size", as used herein, may refer to a number-weighted mean diameter or a volume-weighted mean diameter of a particle distribution.

The polyolefin may have a wide processing window of greater than 5° C., which can be defined by the temperature range between the melting point and the re-crystallization temperature. The polyolefin may have a melting point ranging from about 105° C. to about 215° C. In an example (e.g., when the polyolefin is a polypropylene), the polyolefin may have a melting point of about 160° C.

In some examples, the polyolefin does not substantially absorb radiation having a wavelength within the range of 400 nm to 1400 nm. In other examples, the polyolefin does not substantially absorb radiation having a wavelength within the range of 800 nm to 1400 nm. In still other examples, the polyolefin does not substantially absorb radiation having a wavelength within the range of 400 nm to 1200 nm. In these examples, the polyolefin may be considered to reflect the wavelengths at which the polyolefin does not substantially absorb radiation. The phrase "does not substantially absorb" means that the absorptivity of the polyolefin at a particular wavelength is 25% or less (e.g., 20%, 10%, 5%, etc.).

In some examples, the polyolefin also include the glass, the filler, the antioxidant, the whitener, the antistatic agent, and/or the flow aid in the manners and/or amounts previously described in reference to the build material composition that includes the polyamide.

In some examples, whether the build material composition includes the polyamide or the polymer selected from the polyamide, the polyolefin, and a combination thereof, the build material composition is devoid of an adhesive. Without an adhesive in the build material composition, the applied epoxy agent is able to react with the amino functional groups of the polyamide build material or with the applied amino agent, rather than activating the adhesive. In some of these examples, the build material composition may consist of the polyamide and an additive selected from the group consisting of the glass, the filler, the antioxidant, the whitener, the antistatic agent, the flow aid, or a combination thereof. In others of these examples, the build material composition may consist of the polyolefin and an additive selected from the group consisting of the glass, the filler, the antioxidant, the whitener, the antistatic agent, the flow aid, or a combination thereof.

As used herein, the term "devoid of", when referring to a component (such as, e.g., an adhesive), may refer to a composition that does not include any added amount of the component, but may contain residual amounts, such as in the form of impurities. The components may be present in trace amounts, and in one aspect, in an amount of less than 0.1 weight percent (wt %) based on the total weight of the composition (e.g., the build material composition), even though the composition is described as being "devoid of" the component. In other words, "devoid of" a component may mean that the component is not specifically included, but may be present in trace amounts or as an impurity inherently present in certain ingredients.

In some examples, the build material composition disclosed herein may be reused/recycled. After a print cycle, some of the build material composition disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 50° C. to about 205° C. and then cooling), and reclaimed after each cycle. Between cycles, the recycled build material composition may be mixed with at least some fresh (i.e., not previously used in a 3D printing process) build material composition. In some examples, the weight ratio of the recycled build material composition to the fresh build material composition may be 90:10, 80:20, 70:30, 60:40, 50:50, or 40:60. The weight ratio of the recycled build material composition to the fresh build material composition may depend, in part, on the stability of the build material composition, the discoloration of the recycled build material composition (as compared to the build material composition), the desired aesthetics for the 3D object being formed, the thermal decomposition of the recycled build material composition (as compared to the build material composition), and/or the desired mechanical properties of the 3D object being formed.

Epoxy Agents

In the examples of the 3D printing kit, the multi-fluid kit, the 3D printing composition, the 3D printing methods, and the 3D printing system disclosed herein, an epoxy agent including an epoxy may be used.

The epoxy may be any epoxy, which includes an epoxide functional group. In some of these examples, the epoxide functional group of the epoxy may react with an amino functional group of the polyamide when the epoxy agent is applied on the build material composition. In others of these examples, the epoxide functional group of the epoxy may react with an amino functional group of an amine when the epoxy agent and an amine agent including the amine are applied on the build material composition.

In some examples of the 3D printing kit or composition and/or of the multi-fluid kit, the epoxy has a viscosity at 25° C. ranging from about 5 mPa·s to about 40 mPa·s. In one of these examples, the epoxy has a viscosity at 25° C. of about 20 mPa·s. The epoxy viscosity may be higher as long as it can be formulated into a jettable composition. In one example, the epoxy is trimethylolpropane polyglycidyl ether, which has a viscosity at 25° C. of 130 mPa·s. In other examples of the 3D printing kit or composition and/or of the multi-fluid kit, the epoxy has a viscosity at 25° C. ranging from about 5 mPa·s to about 140 mPa·s.

In some examples of the 3D printing kit or composition and/or of the multi-fluid kit, the epoxy is water-soluble. In some of these examples, the epoxy is also soluble in a co-solvent of the epoxy agent. In some examples, the epoxy has a high enough solubility in water and/or in the co-solvent that the epoxy may be fully dissolved in the epoxy agent. In other examples, the epoxy may have a high enough solubility in water and/or in the co-solvent that the epoxy may be partially dissolved and partially dispersed in the epoxy agent. It may be desirable for the epoxy to be fully dissolved in the epoxy agent so that jetting performance and/or pen health is not deleteriously affected when the epoxy agent is jetted via thermal inkjet printing, piezoelectric inkjet printing, or continuous inkjet printing.

In some examples of the 3D printing kit or composition and/or of the multi-fluid kit, the epoxy is a glycidyl ether. In one example, the epoxy is ethylene glycol diglycidyl ether. Ethylene glycol diglycidyl ether is water-soluble and has a viscosity at 25° C. of about 20 mPa·s. In another example, the epoxy is selected from the group consisting of 2-ethylhexyl glycidyl ether, phenol (EO) 5 glycidyl ether, p-tert-butylphenyl glycidyl ether (i.e., 4-tert-butylphenyl 2,3-epoxypropyl ether, e.g., ARALDITE® M available from Huntsman Advanced Materials), dibromo phenyl glycidyl ether, lauryl alcohol (EO) 15 glycidyl ether, resorcinol diglycidyl ether, neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, and a combination thereof.

In some examples of the 3D printing kit or composition and/or of the multi-fluid kit, the epoxy is present in the epoxy agent in an amount ranging from about 5 wt % active to about 50 wt % active, based on a total weight of the epoxy agent. In one example, the epoxy is present in the epoxy agent in an amount of about 45 wt % active, based on the total weight of the epoxy agent.

In some examples, the epoxy agent includes an aqueous vehicle, in addition to the epoxy. In some of these examples, the epoxy agent consists of the epoxy and the aqueous vehicle with no other components. In others of these examples, the epoxy agent may include additional components.

As used herein, the term "aqueous vehicle" may refer to the liquid in which the epoxy is dispersed or dissolved to form the epoxy agent. A wide variety of aqueous vehicles may be used in the epoxy agent.

In some examples, the aqueous vehicle may include water alone with no other components. In other examples, the aqueous vehicle may include other components, depending, in part, upon the applicator that is to be used to dispense the epoxy agent. Examples of other suitable epoxy agent components include co-solvent(s), humectant(s), surfactant(s), antimicrobial agent(s), anti-kogation agent(s), and/or chelating agent(s).

In an example, the aqueous vehicle includes a co-solvent, a surfactant, and a balance of water. In another example, the aqueous vehicle consists of a co-solvent, a surfactant, and a balance of water. In still another example, the aqueous vehicle consists of a co-solvent, a surfactant, an additive selected from the group consisting of a humectant, an antimicrobial agent, an anti-kogation agent, a chelating agent, and a combination thereof, and a balance of water.

Classes of organic co-solvents that may be used in the epoxy agent include aliphatic alcohols, aromatic alcohols, diols, glycol ethers, polyglycol ethers, lactams, formamides, acetam ides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Some examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the epoxy agent in a total amount ranging from about 1 wt % to about 50 wt % based upon the total weight of the epoxy agent, depending upon the jetting architecture of the applicator. In an example, the total amount of the co-solvent(s) present in the epoxy agent is 25 wt % based on the total weight of the epoxy agent.

The aqueous vehicle may also include humectant(s). In an example, the total amount of the humectant(s) present in the epoxy agent ranges from about 3 wt % active to about 10 wt % active, based on the total weight of the epoxy agent. An example of a suitable humectant is ethoxylated glycerin having the following formula:

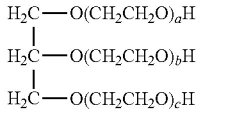

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In some examples, the aqueous vehicle includes surfactant(s) to improve the jettability of the epoxy agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the epoxy agent may range from about 0.01 wt % active to about 10 wt % active based on the total weight of the epoxy agent. In an example, the total amount of surfactant(s) in the epoxy agent may be about 3 wt % active based on the total weight of the epoxy agent.

An anti-kogation agent may be included in the epoxy agent that is to be jetted using thermal inkjet printing. Kogation refers to the deposit of dried printing liquid (e.g., epoxy agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® O3A or CRODAFOS® N-3 acid from Croda), dextran 500k, CRODAFOS™ HCE (phosphate-ester from Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the epoxy agent may range from greater than 0.10 wt % active to about 1.5 wt % active based on the total weight of the epoxy agent. In an example, the oleth-3-phosphate is included in an amount ranging from about 0.20 wt % active to about 0.60 wt % active, and the low molecular weight polyacrylic acid polymer is included in an amount ranging from about 0.005 wt % to about 0.03 wt %.

The aqueous vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the epoxy agent may include a total amount of antimicrobial agents that ranges from about 0.0001 wt % active to about 1 wt % active. In an example, the antimicrobial agent(s) is/are a biocide(s) and is/are present in the epoxy agent in an amount of about 0.25 wt % active (based on the total weight of the epoxy agent).

Chelating agents (or sequestering agents) may be included in the aqueous vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the epoxy agent may range from greater than 0 wt % active to about 2 wt % active based on the total weight of the epoxy agent. In an example, the chelating agent(s) is/are present in the epoxy agent in an amount of about 0.04 wt % active (based on the total weight of the epoxy agent).

The balance of the epoxy agent is water. As such, the amount of water may vary depending upon the amounts of the other components that are included. In an example, deionized water may be used.

In some examples of the 3D printing kit or composition and/or of the multi-fluid kit, the epoxy agent has a viscosity at 25° C. ranging from about 5 mPa·s to about 90 mPa·s. It is to be understood that the aqueous vehicle components may be selected to achieve a viscosity of the epoxy agent within the disclosed range. The desired viscosity may also depend upon the jetting technology that is to be used.

In some examples, the epoxy agent is jettable via thermal inkjet printing, piezoelectric inkjet printing, continuous inkjet printing, or a combination thereof. As such, the aqueous vehicle components may be selected to achieve the desired jettability. For example, if the epoxy agent is to be jettable via thermal inkjet printing, water may make up 35 wt % or more of the epoxy agent. For another example, if the epoxy agent is to be jettable via piezoelectric inkjet printing, water may make up from about 25 wt % to about 30 wt % of the epoxy agent, and 35 wt % or more of the epoxy agent may be ethanol, isopropanol, acetone, etc.

Amine Agents

In the examples of the 3D printing kit, the multi-fluid kit, the 3D printing composition, the 3D printing methods, and the 3D printing system disclosed herein, an amine agent including an amine may be used.

The amine may be selected from the group consisting of aniline sulfonamide (i.e., sulfanilamide), tetraethylenepentamine, dipropylenediamine, diethylaminopropylamine, N-aminoethylpiperazine, bis(2-ethylhexyl)amine, methanediamine, methylphenylenediamine, diaminodiphenylsulfone, and a combination thereof.

In some examples, the amine includes two primary amines. In these examples, the amine may be selected from the group consisting of aniline sulfonamide, tetraethylenepentamine, dipropylenediamine, methanediamine, methylphenylenediamine, diaminodiphenylsulfone, and a combination thereof. In one of these examples, the amine is aniline sulfonamide.

In other examples, the amine includes one primary amine. In these examples, the amine may be selected from the group consisting of diethylaminopropylamine, N-aminoethylpiperazine, and a combination thereof.

In still other examples, the amine includes one secondary amine. In these examples, the amine may be bis(2-ethylhexyl)amine.

The amine in the amine agent reacts with the epoxy in the epoxy agent, when the amine agent and the epoxy agent are both applied on the build material composition. In some examples, the amine includes at least one amino functional group, which is a primary amine. In other examples, the amine includes at least one amino functional group, which is a secondary amine. These functional groups are capable of reacting with the epoxide functional groups of the epoxy, e.g., according to the following general epoxy/amine reaction scheme:

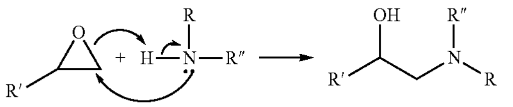

This reaction scheme reflects an epoxy/secondary amine reaction scheme assuming that R and R" are not hydrogen (H) atoms. It is to be understood that this reaction scheme reflects an epoxy/primary amine reaction scheme when either R or R" is a hydrogen (H) atom.

When the build material includes the polyamide, the polyamide also includes amino functional groups that are capable of reacting with the epoxide functional group of the epoxy. In some instances, the epoxide functional group of the epoxy may chemoselectively (i.e., more favorably) react with the amino functional group(s) of the amine when the group(s) are primary amine group(s) rather than the amino functional group(s) of the polyamide (which, in some instances, are secondary amine groups and/or tertiary amine groups). As such, in these instances, the amine and the epoxy may form a thermoset composite within the matrix of the fused/coalesced polyamide. In other instances, some of the epoxide functional groups may react with the amino functional group(s) of the amine and some other of the epoxide functional groups may react with the amino functional group(s) of the polyamide. This may be more likely to occur when the amino functional group(s) of the amine are secondary amine group(s). As such, in these instances, the polyamide and some of the epoxy may form a thermoset matrix that contains a thermoset composite formed from the amine and some of the epoxy.

When the build material includes the polyolefin, the polyolefin may not have a functional group capable reacting with the epoxide functional group of the epoxy, or the epoxide functional group of the epoxy may chemoselectively react with the amine rather than any functional group of the polyolefin that is capable of reacting with the epoxide functional group of the epoxy. As such, the amine and the epoxy may form a thermoset composite within the matrix of the fused/coalesced polyolefin.

In some examples, the amine is present in the amine agent in an amount ranging from about 1 wt % active to about 50 wt % active, based on a total weight of the amine agent. In one example, the amine is present in the amine agent in an amount of about 10 wt % active, based on a total weight of the amine agent.

In some examples, the amine agent may also include a vehicle (e.g., a co-solvent, a surfactant, water, etc.). In these examples, the amine may be dissolved or dispersed (depending on the amine and the solvent system selected) in the vehicle to form the amine agent. In some of these examples, the amine agent consists of the amine and the vehicle with no other components. In other of these examples, the amine agent may include additional components (e.g., an energy absorber).

In some examples, the vehicle of the amine agent may be similar to the aqueous vehicle of the epoxy agent. As such, the vehicle of the amine agent may include any of the components described above in reference to the epoxy agent in any of the amount described above (with the amount(s) being based on the total weight of the amine agent rather than the total weight of the epoxy agent).

In some examples, the amine agent is jettable via thermal inkjet printing, piezoelectric inkjet printing, continuous inkjet printing, or a combination thereof. As such, similar to the epoxy agent, the vehicle components of the amine may be selected to achieve the desired jettability. For example, if the amine agent is to be jettable via thermal inkjet printing, water may make up 35 wt % or more of the amine agent. For another example, if the amine agent is to be jettable via piezoelectric inkjet printing, water may make up from about 25 wt % to about 30 wt % of the amine agent, and 35 wt % or more of the amine agent may be ethanol, isopropanol, acetone, etc.

In some examples of the 3D printing kit or composition and/or of the multi-fluid kit, the amine agent further includes an energy absorber. In some of these examples, the amine agent consists of the amine, the energy absorber, and the vehicle. In others of these examples, the amine agent may include additional components.

When the amine agent includes an energy absorber, the amine agent may function as both the amine agent (providing a reactive amino functional group) and as a fusing agent (providing an energy absorber to enhance heating in the patterned build material regions). In these examples, the amine agent may be considered to be a fusing agent in addition to an amine agent (e.g., a combined fusing/amine agent).

When the amine agent includes an energy absorber, any of the examples of the energy absorber described below in reference to the fusing agent may be used. In an example, the amine agent may include, as the energy absorber, carbon black or an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof. The energy absorber may be present in the amine agent in an amount ranging from greater than 0 wt % active to about 40 wt % active, based on the total weight of the amine agent.

Fusing Agents

In the examples of the 3D printing kit, the multi-fluid kit, the 3D printing composition, the 3D printing methods, and the 3D printing system disclosed herein, a fusing agent may be used. As such, some examples of the 3D printing kit or composition and/or of the multi-fluid kit further comprise a fusing agent to be applied to at least the portion of the build material composition during 3D printing, wherein the fusing agent includes an energy absorber. In some examples, the energy absorber may have substantial absorption (e.g., 80%) at least in the visible region (400 nm-780 nm) and may also absorb energy in the infrared region (e.g., 800 nm to 4000 nm). In other examples, the energy absorber may have absorption at wavelengths ranging from 800 nm to 4000 nm and have transparency at wavelengths ranging from 400 nm to 780 nm. As used herein "absorption" means that at least 80% of radiation having wavelengths within the specified range is absorbed. Also as used herein, "transparency" means that 25% or less of radiation having wavelengths within the specified range is absorbed.

In some examples, the energy absorber may be an infrared light absorbing colorant. In an example, the energy absorber is a near-infrared light absorber. Any near-infrared colorants, e.g., those produced by Fabricolor, Eastman Kodak, or BASF, Yamamoto, may be used in the fusing agent. As one example, the fusing agent may be a printing liquid formulation including carbon black as the energy absorber. Examples of this printing liquid formulation are commercially known as CM997A, 516458, C18928, C93848, C93808, or the like, all of which are available from HP Inc.

As another example, the fusing agent may be a printing liquid formulation including near-infrared absorbing dyes as the energy absorber. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

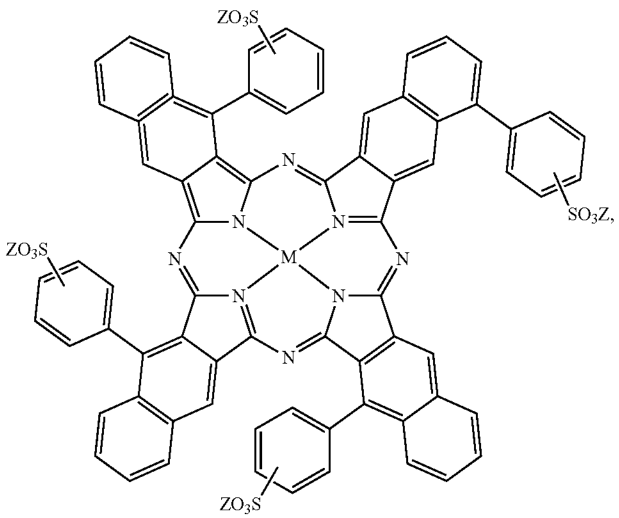

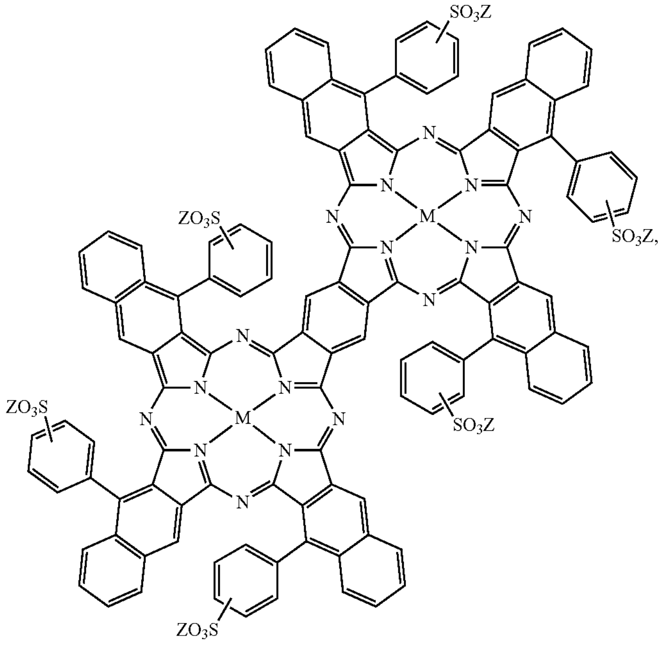

-continued

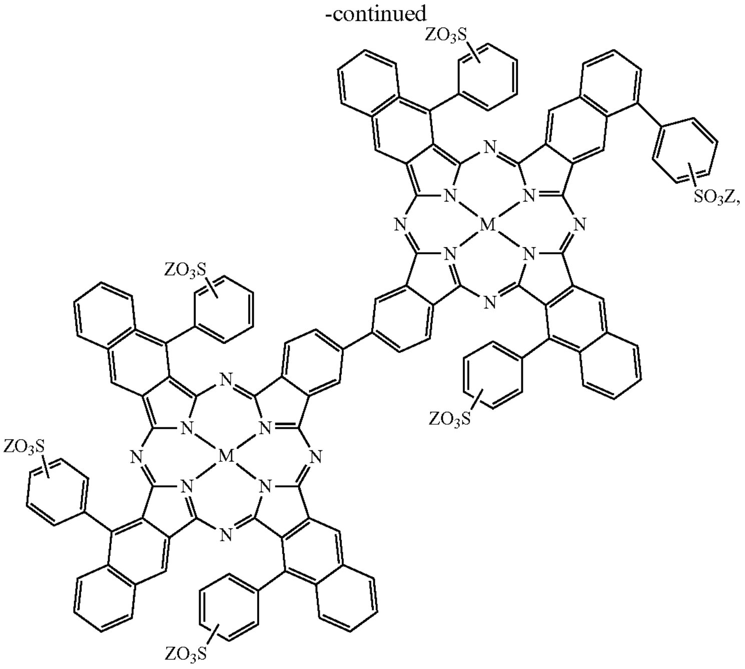

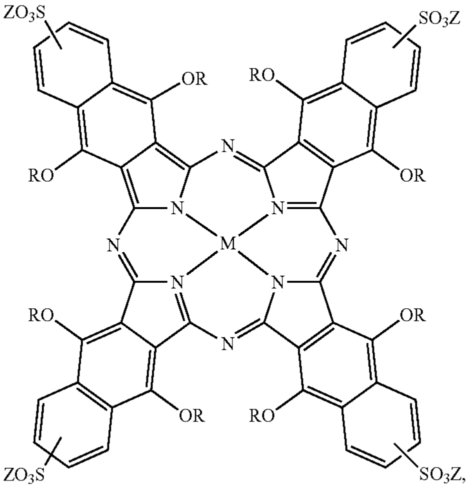

and mixtures thereof. In the above structures, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

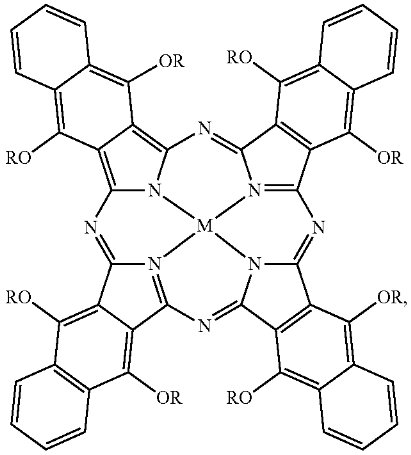

-continued

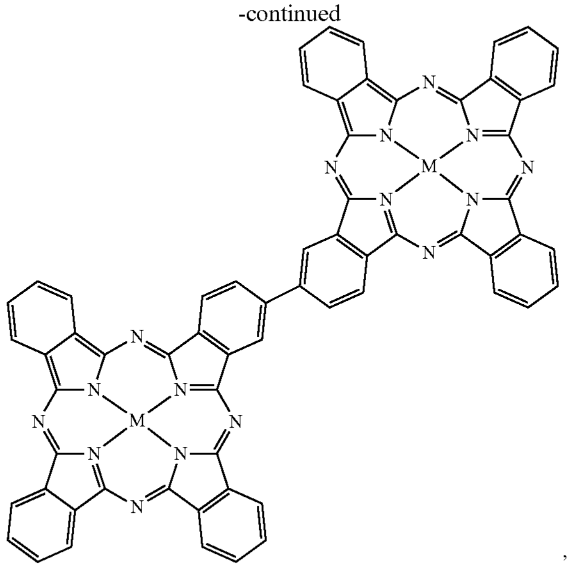

,

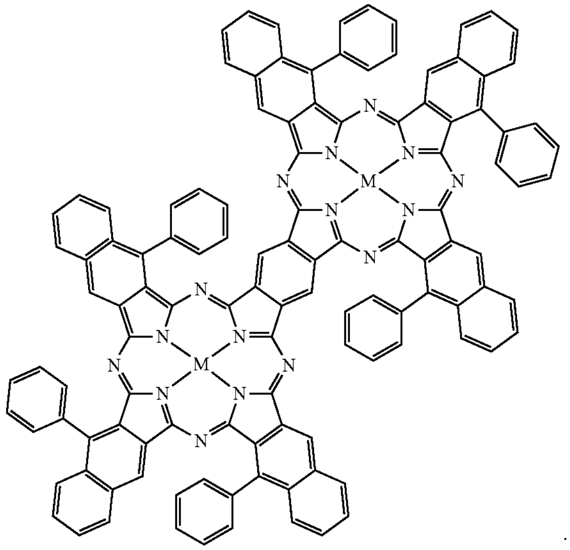

.

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

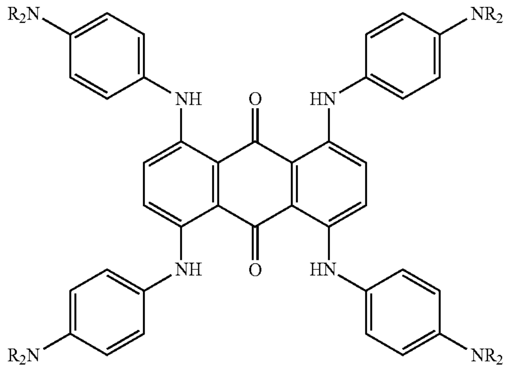

Anthroquinone dyes/pigments

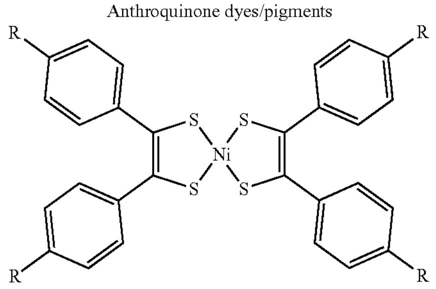

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

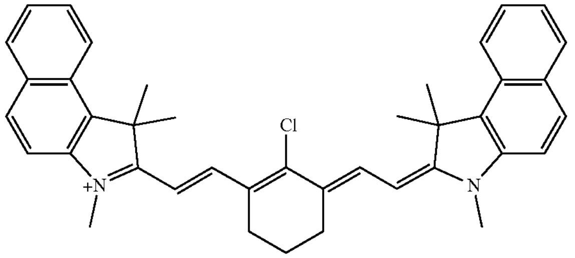

Cyanine dyes/pigments

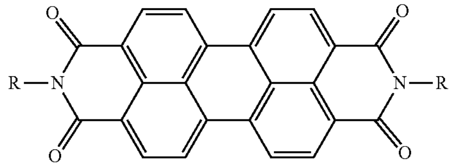

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

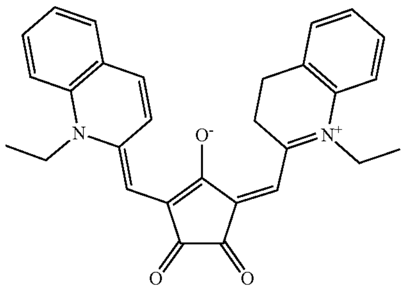

Croconium dyes/pigments

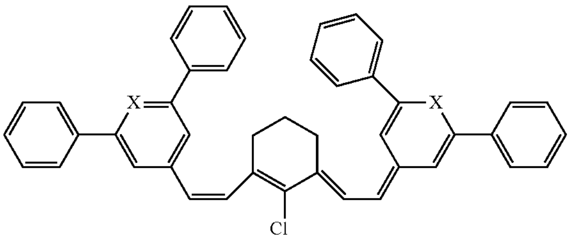

Pyrilium (X = O), thiopyrilium (X = S) dyes/pigments

Boron-dipyrromethene dyes or pigments and aza-boron-dipyrromethene dyes or pigments may have the following structures, respectively:

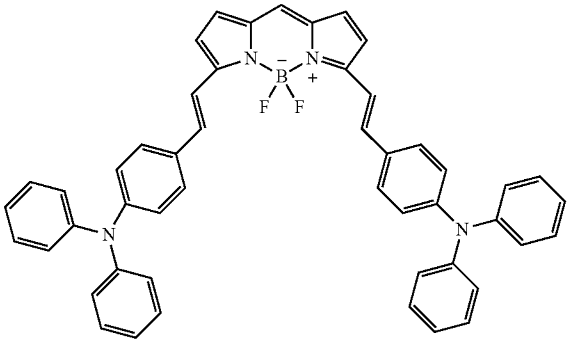

boron-dipyrromethene dyes/pigments

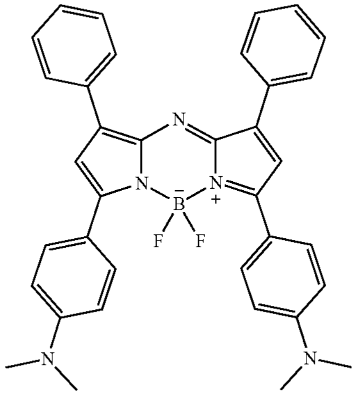

aza-boron-dipyrromethene dyes/pigments

In other examples, the energy absorber may be the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent to be inkjet jettable as well as electromagnetically selective (e.g., having absorption at wavelengths ranging from 800 nm to 4000 nm and transparency at wavelengths ranging from 400 nm to 780 nm).

In an example, this energy absorber has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, this energy absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the fusing agent ranges from greater than 0 wt % active to about 40 wt % active based on the total weight of the fusing agent. In other examples, the amount of the energy absorber in the fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the fusing agent having jetting reliability and heat and/or radiation absorbance efficiency.

The fusing agent may also include a FA vehicle in which the energy absorber is dispersed or dissolved to form the fusing agent. A wide variety of FA vehicles, including aqueous and non-aqueous vehicles, may be used in the fusing agent.

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent. In other examples, the FA vehicle may include other components, depending, in part, upon the applicator that is to be used to dispense the fusing agent. Examples of other suitable fusing agent components include dispersant(s), silane coupling agent(s), co-solvent(s), humectant(s), surfactant(s), antimicrobial agent(s), anti-kogation agent(s), and/or chelating agent(s).

In some examples, the FA vehicle of the fusing agent may be similar to the aqueous vehicle of the epoxy agent. As such, the FA vehicle of the fusing agent may include any of the components described above in reference to the epoxy agent in any of the amount described above (with the amount(s) being based on the total weight of the fusing agent rather than the total weight of the epoxy agent).

When energy absorber is an inorganic pigment (having absorption at wavelengths ranging from 800 nm to 4000 nm and transparency at wavelengths ranging from 400 nm to 780 nm), the FA vehicle may also include dispersant(s) and/or silane coupling agent(s).

The energy absorber (i.e., the inorganic pigment having absorption at wavelengths ranging from 800 nm to 4000 nm and transparency at wavelengths ranging from 400 nm to 780 nm) may, in some instances, be dispersed with a dispersant. As such, the dispersant helps to uniformly distribute the energy absorber throughout the fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent may range from about 10 wt % to about 200 wt % based on the weight of the energy absorber in the fusing agent.

A silane coupling agent may also be added to the fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent may range from about 0.1 wt % active to about 50 wt % active based on the weight of the energy absorber in the fusing agent. In an example, the total amount of silane coupling agent(s) in the fusing agent ranges from about 1 wt % active to about 30 wt % active based on the weight of the energy absorber. In another example, the total amount of silane coupling agent(s) in the fusing agent ranges from about 2.5 wt % active to about 25 wt % active based on the weight of the energy absorber.

Printing Methods and Methods of Use

Figure 1B:
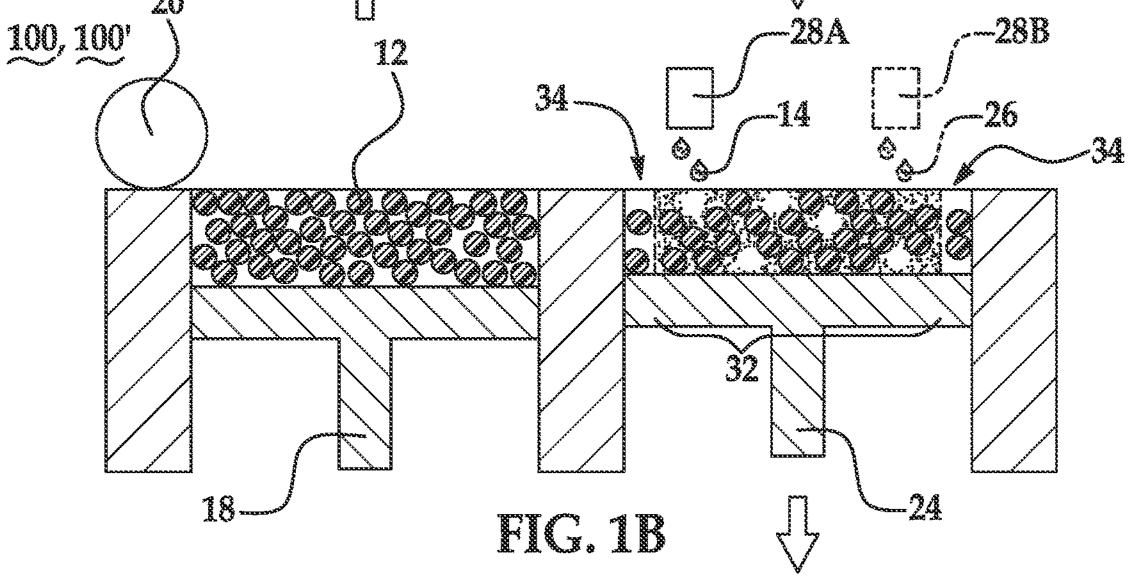
Figure 1C:
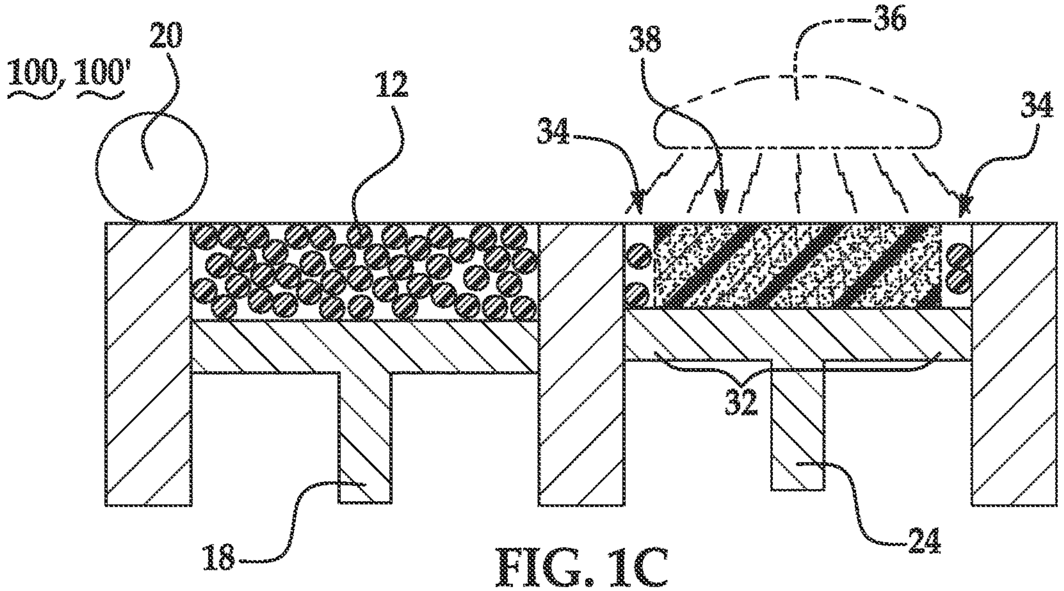

Referring now to FIGS. 1A through 1C examples of a method 100 for using the 3D printing kit or multi-fluid kit and method 100' for 3D printing are depicted. The examples of the methods 100, 100' may use examples of the 3D printing kit and/or composition and/or multi-fluid kit disclosed herein. Additionally, the examples of the methods 100, 100' may be used to print 3D objects that have increased ultimate tensile strength, decreased elongation at break, increased thermal stability, and/or higher heat deflection temperatures (as compared to 3D objects formed without the epoxy agent 14).

In some examples, the method 100 for using the three-dimensional (3D) printing kit comprises: applying a build material composition 12 to form a build material layer 30, the build material composition 12 including a polyamide having an amino functional group; based on a 3D object model, selectively applying an epoxy agent 14 on at least a portion 32 of the build material layer 30, the epoxy agent 14 including an epoxy having an epoxide functional group; based on the 3D object model, selectively applying a fusing agent 26 on the at least the portion 32 of the build material layer 30, the fusing agent 26 including an energy absorber; and exposing the build material layer 30 to electromagnetic radiation to form a thermoset composition 38 from the polyamide and the epoxy in the at least the portion 32.

In some other examples, the method 100' for three-dimensional (3D) printing comprises: applying a build material composition 12 to form a build material layer 30, the build material composition 12 including a polyamide having an amino functional group, and the build material composition 12 being devoid of an adhesive; and based on a 3D object model, selectively applying an epoxy agent 14 on at least a portion 32 of the build material layer 30, the epoxy agent 14 including an epoxy and an aqueous vehicle, the epoxy having an epoxide functional group. Some examples of the method 100' do not involve a fusing agent 26, and further include heating the build material layer 30 to a temperature that is i) below a melting temperature of the polyamide and ii) sufficient to initiate a reaction between the epoxide functional group of the epoxy and the amino functional group of the polyamide to form a thermoset composition 38 in the at least the portion 32. Other examples of the method 100' do involve a fusing agent 26, and further include selectively applying, based on the 3D object model, a fusing agent 26 on the at least the portion 32 of the build material layer 30, the fusing agent 26 including an energy absorber; and exposing the build material layer 30 to electromagnetic radiation to form a thermoset composition 38 from the polyamide and the epoxy in the at least the portion 32.

The methods 100, 100' may use a 3D printing system. As depicted in FIGS. 1A through 1C, the 3D printing system may include a supply bed 16 (including a supply of build material composition 12), a delivery piston 18, a build material distributor 20, a fabrication bed 22 (having a contact surface 23), a fabrication piston 24, a first inkjet applicator 28A, a second inkjet applicator 28B, and an energy source 36 (e.g., when a fusing agent 26 is used) or another heating mechanism (e.g., when a fusing agent 26 is not used).

Figure 3:
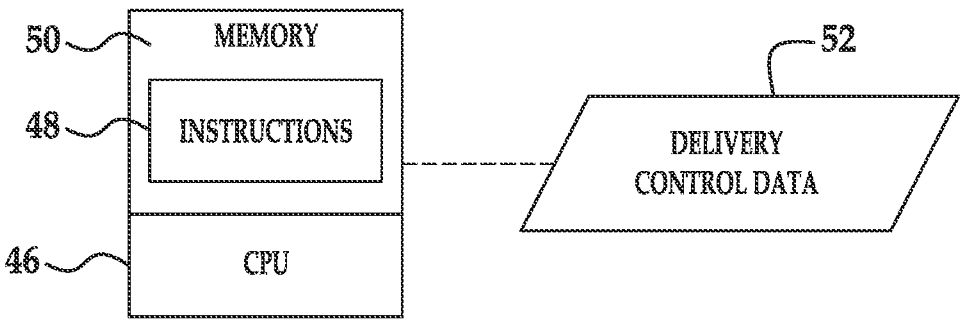
FIG. 3 is a block diagram illustrating a portion of a 3D printing system that can use an example of the 3D printing kit disclosed herein.

Each of these physical elements of the 3D printing system may be operatively connected to a central processing unit 46 (see FIG. 3) of the 3D printing system. The central processing unit 46 (e.g., running computer readable instructions 48 stored on a non-transitory, tangible computer readable storage medium) manipulates and transforms data represented as physical (electronic) quantities within the printer's registers and memories 50 in order to control the physical elements to create the 3D object. The data for the selective delivery of the build material composition 12, the epoxy agent 14, the fusing agent 26, etc. may be derived from a 3D model of the 3D object to be formed. For example, the instructions 48 may cause the controller to utilize a build material distributor 20 to dispense the build material composition 12, and to utilize an applicator (e.g., an inkjet applicator 28A) to selectively dispense the epoxy agent 14 and/or the fusing agent 26. The central processing unit 46 controls the selective delivery (i.e., dispensing) of the epoxy agent 14 (and in some instances the fusing agent 26) in accordance with delivery control data 52.

The methods 100, 100' involve applying the build material composition 12 to form a build material layer 30. As mentioned above, in examples of the methods 100, 100', the build material composition 12 includes at least a polyamide having an amino functional group. In these examples, the build material composition 12 may further include the glass, the filler, the antioxidant, the whitener, the antistatic agent, the flow aid, or combinations thereof.

An example of the application of the build material composition 12 is shown in FIG. 1A. The delivery piston 18 and the fabrication piston 24 may be the same type of piston, but are programmed to move in opposite directions. In an example, when a layer of the 3D object is to be formed, the delivery piston 18 may be programmed to push a predetermined amount of the build material composition 12 out of the opening in the supply bed 16 and the fabrication piston 24 may be programmed to move in the opposite direction of the delivery piston 18 in order to increase the depth of the fabrication bed 22. The delivery piston 18 will advance enough so that when the build material distributor 20 pushes the build material composition 12 into the fabrication bed 22 and onto the contact surface 23 or a previously formed layer, the depth of the fabrication bed 22 is sufficient so that a layer 30 of the build material composition 12 may be formed in the fabrication bed 22. The build material distributor 20 is capable of spreading the build material composition 12 into the fabrication bed 22 to form a build material layer 30, which is relatively uniform in thickness.

In an example, the build material layer 30 has a thickness ranging from about 50 μm to about 120 μm. In another example, the thickness of the build material layer 30 ranges from about 30 μm to about 300 μm. It is to be understood that thinner or thicker layers may also be used. For example, the thickness of the build material layer 30 may range from about 20 μm to about 500 μm. The layer thickness may be about 2× (i.e., 2 times) the average diameter of the build material composition particles at a minimum for finer part definition. In some examples, the layer thickness may be about 1.2× the average diameter of the build material composition particles.

While one example of the printing system is depicted, it is to be understood that other printing systems may also be used. For example, another support member, such as a build area platform, a platen, a glass plate, or another build surface may be used instead of the fabrication bed 22. As another example, another build material supply, such as a container or other surface that is to position the build material composition 12 between the build material distributor 20 and the contact surface 23 may be used instead of the supply bed 16. In some examples, the build material supply may include a surface upon which the build material composition 12 may be supplied, for instance, from a build material source (not shown) located above the build material supply.

The build material distributor 20 may be moved over the supply bed 16 and across the contact surface 23 to spread a layer of the build material composition 12 over the contact surface 23. The build material distributor 20 may also be returned to a position adjacent to the supply bed 16 following the spreading of the build material composition 12. The build material distributor 20 may be a blade (e.g., a doctor blade), a roller, a combination of a roller and a blade, and/or any other device capable of spreading the build material composition 12 over the contact surface 23. For instance, the build material distributor 20 may be a counter-rotating roller.

In some examples (not shown), after the build material composition 12 has been applied, and prior to further processing, the build material layer 30 may be exposed to heating. Heating may be performed to pre-heat the build material composition 12, and thus the pre-heating heating temperature may be below the melting point of the polyamide of the build material composition 12. As such, the pre-heating temperature selected will depend upon the polyamide that is used. As examples, the pre-heating temperature may be from about 5° C. to about 50° C. below the melting point of the polyamide. In an example, the pre-heating temperature ranges from about 50° C. to about 205° C. In another example, the pre-heating temperature ranges from about 100° C. to about 205° C. In yet another example, the pre-heating temperature ranges from about 100° C. to about 190° C.

Pre-heating the layer 30 of the build material composition 12 may be accomplished by using any suitable heat source that exposes all of the build material composition 12 in the fabrication bed 22 to the heat. Examples of the heat source include a thermal heat source (e.g., a heater (not shown) integrated into the fabrication bed 22 (which may include sidewalls)) or the energy source 36.

After the layer 30 is formed, and in some instances is pre-heated, the methods 100, 100' involve selectively applying the epoxy agent 14 on at least a portion 32 of the build material layer 30. As mentioned above, in examples of the methods 100, 100', the epoxy agent 14 includes at least an epoxy having an epoxide functional group. As also mentioned above, in examples of the methods 100, 100', the epoxy agent 14 further includes an aqueous vehicle.

An example of the selective application of the epoxy agent 14 is shown in FIG. 1B. As shown in FIG. 1B, the printing system also includes a first inkjet applicator 28A for selectively dispensing the epoxy agent 14. The inkjet applicator 28A may include nozzles, fluid slots, and/or fluidics for dispensing the epoxy agent 14. The inkjet applicator 28A may be a thermal inkjet printhead or print bar, a piezoelectric printhead or print bar, or a continuous inkjet printhead or print bar. While a single inkjet applicator 28A is shown in FIG. 1B, it is to be understood that multiple inkjet applicators 28A may be used.

The inkjet applicator 28A may be scanned adjacent to the contact surface 23 to deposit the epoxy agent 14 over a layer of the build material composition 12. The inkjet applicator 28A may thus be attached to a moving XY stage or a translational carriage (neither of which is shown) that moves the inkjet applicator 28A adjacent to the contact surface 23 in order to deposit the epoxy agent 14 in predetermined areas of a layer of the build material composition 12 that has been formed on the contact surface 23 or on a previously formed 3D object layer in accordance with the method(s) disclosed herein.

The inkjet applicator 28A selectively applies the epoxy agent 14 on those portions 32 of the layer 30 of the build material composition 12 that are to form the thermoset composition 38, and ultimately the final 3D object. The epoxy agent 14 may be applied on less than the entire layer 30, and thus portions 34 of the build material composition 12 remain non-patterned. It is to be understood that portions 34 that do not have the epoxy agent 14 applied thereon do not form the thermoset composition 38.

The epoxy agent 14 may be selectively applied on the build material composition 12 in an amount such that the epoxy makes up from about 2 wt % to about 15 wt % of the thermoset composition 38, based on the total weight of the thermoset composition 38. In one example, the epoxy agent 14 may be selectively applied on the build material composition 12 in an amount such that the epoxy makes up about 5 wt % of the thermoset composition 38, based on the total weight of the thermoset composition 38. The amount of the epoxy agent 14 applied may depend, at least in part, on the epoxy used, the epoxy loading in the epoxy agent 14, and the build material composition 12 used.

In some examples, the method 100' does not include applying a fusing agent 26 or exposing the build material layer 30 to electromagnetic radiation. Rather, the method 100' includes heating the build material layer 30 to a temperature i) below a melting temperature of the build material composition 12 and ii) sufficient to initiate a reaction between the epoxide functional group of the epoxy and the amino functional group of the polyamide. In these examples, the epoxide functional group reacts with the amino functional group to form the thermoset composition 38. This reaction may take place at room temperature, however, the reaction rate at room temperature may be very slow. By heating the patterned build material layer 30, the reaction between the epoxide and the amino functional groups, and thus the curing of the patterned portion(s) 32, may be accelerated. The temperature to which the layer 30 may be heated ranges from about 100° C. to about 180° C. As such, the heating temperature in the method 100' may be similar to the pre-heating temperature. In some instances, heating is accomplished with overhead lamps or a heater integrated into the fabrication bed 22. In these examples, the method 100' may include repeating the applying of the build material composition 12, the selectively applying of the epoxy agent 14, and the heating to form additional layers of the thermoset composition 38, and ultimately the final 3D object.

In examples of the method 100 and some examples of the method 100', the methods 100, 100' involve selectively applying the fusing agent 26 on the at least the portion 32 of the build material layer 30. As mentioned above, the fusing agent 26 includes at least the energy absorber.

An example of the selective application of the fusing agent 26 is shown in FIG. 1B. As shown in FIG. 1B, the printing system may also include a second inkjet applicator 28B for selectively dispensing the fusing agent 26. The second inkjet applicator 28B may be similar to the first inkjet applicator 28A. As such, any of the description of the first inkjet applicator 28A may be applicable to the second inkjet applicator 28B.

The second inkjet applicator 28B selectively applies the fusing agent 26 on those portions 32 of the layer 30 of the build material composition 12 that are to form the thermoset composition 38, and ultimately the final 3D object. The fusing agent 26 may be applied on less than the entire layer 30, and thus portions 34 of the build material composition 12 remain non-patterned. It is to be understood that in these examples of the method 100, 100', portions 34 that do not have the fusing agent 26 applied thereon do not form the thermoset composition 38 and do not fuse/coalesce.

The fusing agent 26 may be selectively applied on the build material composition 12 in an amount sufficient to absorb and convert enough electromagnetic radiation to heat so that the polyamide melts and so that the thermoset composition 38 forms. The amount of the fusing agent 26 applied may depend, at least in part, on the energy absorber used, the energy absorber loading in the fusing agent 26, and the build material composition 12 used.

After the epoxy agent 14 and the fusing agent 26 are selectively applied in the at least the portion 32 of the layer 30, the entire layer 30 of the build material composition 12 may be exposed to electromagnetic radiation. An example of this is shown in FIG. 1C.

The electromagnetic radiation is emitted from the energy source 36. The energy source 36 may be any source that emits electromagnetic radiation that can be absorbed by the energy absorber in the fusing agent 26. In an example, the energy source 36 emits electromagnetic radiation having a wavelength ranging from about 400 nm to about 1700 nm. Examples of suitable energy sources 36 include an IR or near-IR curing lamp, or IR or near-IR light emitting diodes (LED), lasers with specific IR or near-IR wavelengths, visible light sources, or the like.

The energy source 36 may be a stationary lamp 36 or a moving lamp (not shown). The stationary lamp 36 may be in a fixed position relative to the fabrication bed 22, and may be turned on when radiation exposure is desired and off when radiation exposure is not desired. The moving lamp(s) can be mounted on a track (e.g., translational carriage) to move across the fabrication bed 22. This allows for printing and radiation exposure in a single pass. Such lamps can make multiple passes over the fabrication bed 22 depending on the amount of exposure utilized in the method(s) disclosed herein.

The length of time the electromagnetic radiation is applied for, or energy exposure time, may be dependent, for example, on one or more of: characteristics of the energy source 36; characteristics of the build material composition 12; characteristics of the epoxy agent 14; and/or characteristics of the fusing agent 26.

When the fusing agent 26 is used, the fusing agent 26 may enhance the absorption of the radiation, convert the absorbed radiation to thermal energy, and promote the transfer of the thermal heat to the build material composition 12 and the epoxy agent 14. In an example, the fusing agent 26 sufficiently elevates the temperature of the build material composition 12 to a temperature above the melting point of the polyamide, allowing coalescing/fusing to occur. The elevated temperature may also accelerate the reaction between the epoxide functional group of the epoxy and the amino functional group of the coalesced/fused polyamide to form the thermoset composition 38.

In some examples, the methods 100, 100' may include repeating the applying of the build material composition 12, the selectively applying of the epoxy agent 14, the selectively applying of the fusing agent 26, and the exposing to electromagnetic radiation to form additional layers of the thermoset composition 38, and ultimately the final 3D object.

Figures 2A, 2B, 2C:
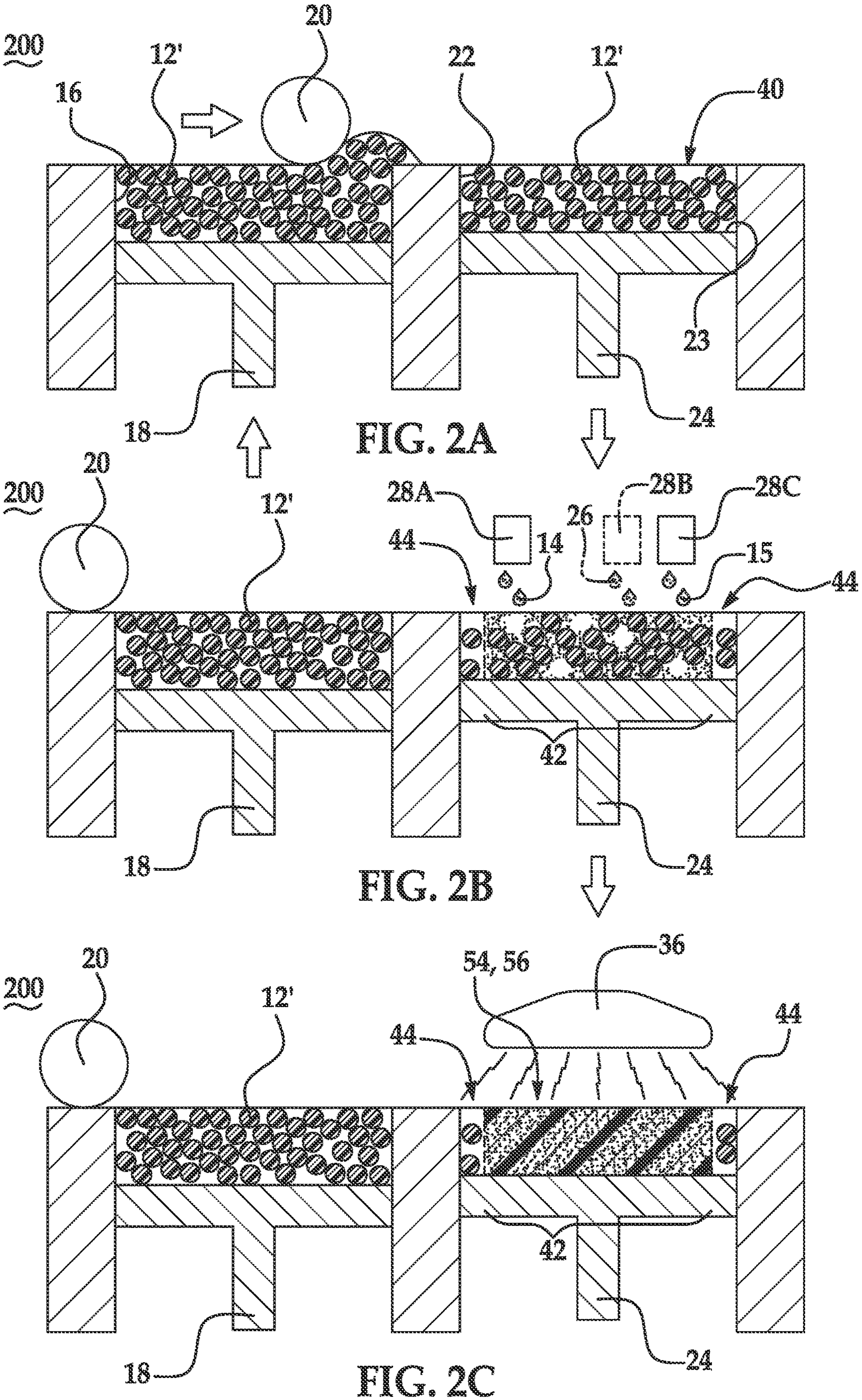
FIGS. 2A through 2C are schematic and partially cross-sectional views depicting the formation of a layer of a 3D object using other examples of the 3D printing kit and other examples of the 3D printing methods disclosed herein.

Referring now to FIGS. 2A through 2C, examples of another method 200 for 3D printing are depicted. The examples of the method 200 may use examples of the multi-fluid kit disclosed herein. Additionally, the examples of the method 200 may be used to print 3D objects that have increased ultimate tensile strength, decreased elongation at break, increased thermal stability, and/or higher heat deflection temperatures (as compared to 3D objects formed without the epoxy agent 14).

In some examples, the method 200 for 3D printing comprises: applying a build material composition 12' to form a build material layer 40, the build material composition 12' including a polymer selected from the group consisting of a polyamide, a polyolefin, and a combination thereof; based on a 3D object model, selectively applying an epoxy agent 14 on at least a portion 42 of the build material layer 40, the epoxy agent 14 including an epoxy; based on the 3D object model, selectively applying an amine agent 15 on the at least the portion 42 of the build material layer 40, the amine agent 15 including an amine selected from the group consisting of aniline sulfonamide, tetraethylenepentamine, dipropylenediamine, diethylaminopropylamine, N-aminoethylpiperazine, bis(2-ethylhexyl)amine, methanediamine, methylphenylenediamine, diaminodiphenylsulfone, and a combination thereof; and exposing the build material layer 40 to electromagnetic radiation to fuse the polymer in the at least the portion 42; wherein the epoxy of the epoxy agent 14 reacts with the amine of the amine agent 15 to form a composite 54 within the fused polymer 56.

The method 200 may use a 3D printing system. As depicted in FIGS. 2A through 2C, the 3D printing system used in the method 200 may be similar to the 3D printing system used in the methods 100, 100'. As such, any of the description of the the 3D printing system used in the methods 100, 100' may be applicable to the 3D printing system used in the method 200. In an example, the 3D printing system may include a supply bed 16 (including a supply of build material composition 12'), a delivery piston 18, a build material distributor 20, a fabrication bed 22 (having a contact surface 23), a fabrication piston 24, a first inkjet applicator 28A, a second inkjet applicator 28B, a third inkjet applicator 28C, and an energy source 36.

The method 200 involves applying the build material composition 12' to form a build material layer 40. As mentioned above, in examples of the method 200, the build material composition 12' includes at least a polymer selected from the group consisting of a polyamide, a polyolefin, and a combination thereof. In these examples, the build material composition 12' may further include the glass, the filler, the antioxidant, the whitener, the antistatic agent, the flow aid, or combinations thereof.

An example of the application of the build material composition 12' is shown in FIG. 2A. The build material layer 40 may be applied in the same manner as described above in reference to the build material layer 30.

The build material layer 40 may be exposed to pre-heating in the manner described above in reference to the build material layer 30. Heating may be performed to pre-heat the build material composition 12, and thus the pre-heating heating temperature may be below the melting point of the polyamide and/or the polyolefin of the build material composition 12.

After the layer 40 is applied, and in some instances is pre-heated, the method 200 includes selectively applying the epoxy agent 14 on at least a portion 42 of the build material layer 40. As mentioned above, in examples of the method 200, the epoxy agent 14 includes at least an epoxy.

The method 200 also includes selectively applying the amine agent 15 on the at least the portion 42 of the build material layer 40. In examples of the method 200, the amine agent 15 includes at least the amine.

Examples of the selective application of the epoxy agent 14, and the selective application of the amine agent 15 are shown in FIG. 2B. As shown in FIG. 2B, the epoxy agent 14 may be applied with the first inkjet applicator 28A. As also shown in FIG. 2B, the printing system may also include a third inkjet applicator 28C for selectively dispensing the amine agent 15. The third inkjet applicator 28C may be similar to the first inkjet applicator 28A. As such, any of the description of the first inkjet applicator 28A may be applicable to the third inkjet applicator 28C.

The epoxy agent 14 and the amine agent 15 are applied on those portions 42 of the layer 40 of the build material composition 12' that are to form a composite 54 within the fused polymer 56. The epoxy agent 14 and the amine agent 15 may be applied on less than the entire layer 40. As shown at the portions 44 in FIG. 2B, the epoxy agent 14 and the amine agent 15 are not applied thereto. It is to be understood that portions 44 that do not have the epoxy agent 14 and the amine agent 15 applied thereon do not form the composite 54.

In some example of the method 200, the epoxy of the epoxy agent 14 reacts with the amine of the amine agent 15 to form the composite 54 at room temperature. This reaction may be accelerated at the temperature of the build material layer 40, which may be the same as or close to the pre-heating temperature. In these examples, the epoxy and the amine may begin to react and form the composite 54 when they are applied together on the pre-heated build material layer 40.

In some examples, the method 200 includes selectively applying the fusing agent 26 on the at least the portion 42 of the build material layer 40. As mentioned above, the fusing agent 26 includes at least the energy absorber.

An example of the selective application of the fusing agent 26 is shown in FIG. 2B. As shown in FIG. 2B, the fusing agent 26 may be applied with the second inkjet applicator 28B.

The fusing agent 26 may be applied on those portions 42 of the layer 40 of the build material composition 12' that are to fuse/coalesce to form the fused polymer 56 with the composite 54 therein. The fusing agent 26 may be applied on less than the entire layer, e.g., portions 44 do not have the fusing agent 26 applied thereon. It is to be understood that portions 44 that do not have the fusing agent 26 applied thereon do not fuse/coalesce.

The fusing agent 26 may be selectively applied on the build material composition 12' in an amount sufficient to absorb and convert enough electromagnetic radiation to heat so that the polymer fuses/coalesces and so that the reaction between the epoxide and amino functional groups is accelerated. The amount of the fusing agent 26 applied may depend, at least in part, on the energy absorber used, the energy absorber loading in the fusing agent 26, and the build material composition 12' used.

In some examples, the amine agent 15 may include the radiation absorber, in addition to the amine. In these examples, the amine agent 15 may also function as a fusing agent 26. As such, in these examples, a separate fusing agent 26 is not used.

After the epoxy agent 14, the amine agent 15, and the fusing agent 26, or the epoxy agent 14 and the combined amine/fusing agent are selectively applied to the at least the portion 42 of the layer 40, the entire layer 40 of the build material composition 12' may be exposed to electromagnetic radiation. An example of this is shown in FIG. 2C.

The build material layer 40 may be exposed to electromagnetic radiation in the manner previously described. In the method 200, the length of time the electromagnetic radiation is applied for, or energy exposure time, may be dependent, for example, on one or more of: characteristics of the energy source 36; characteristics of the build material composition 12'; characteristics of the epoxy agent 14; characteristics of the amine agent 15; and/or characteristics of the fusing agent 26.

The fusing agent 26 or the combined amine/fusing agent may enhance the absorption of the radiation, convert the absorbed radiation to thermal energy, and promote the transfer of the thermal heat to the build material composition 12', epoxy agent 14, and the amine agent 15. In an example, the fusing agent 26 or the combined amine/fusing agent sufficiently elevates the temperature of the build material composition 12' to a temperature above the melting point of the polyamide and/or polyolefin, which enables coalescing/fusing of the build material composition 12' to occur, which forms a polymer matrix. The elevated temperature may also accelerate the reaction between the epoxide functional group of the epoxy and the amino functional group of the amine to form the thermoset composite 54 with the polymer matrix.

In some examples, the method 200 may include repeating the applying of the build material composition 12', the selectively applying of the epoxy agent 14, the selectively applying of the amine agent 15, the selectively applying of the fusing agent 26, and the exposing to electromagnetic radiation to form additional layers, and ultimately the final 3D object. In other examples, the method 200 may include repeating the applying of the build material composition 12', the selectively applying of the epoxy agent 14, the selectively applying of the combined amine/fusing agent, and the exposing to electromagnetic radiation to form additional layers, and ultimately the final 3D object.

In any of the methods 100, 100', 200 disclosed herein, different shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed. Moreover, the fusing agent(s) 26 used for any particular layer or portion of a layer may depend, in part, on desired strength characteristics and/or aesthetics of the particular layer being formed.

To further illustrate the present disclosure, examples are given herein. It is to be understood that these example are provided for illustrative purposes and are not to be construed as limiting the scope of the present disclosure.

EXAMPLES

Example 1

Two examples of the build material composition disclosed herein were obtained. The first example build material composition (labeled "First PA 12" in Table 1) included a polyamide 12. The second example build material composition (labeled "Second PA 12" in Table 1) included a polyamide 12. The polyamide 12 included in the second example build material composition was more reactive than the polyamide included in the first example build material composition. Each example build material included less than 5 wt % of additives (i.e., antioxidant(s), whitener(s), anti-static agent(s), and flow aid(s)).

An example epoxy agent was used, which included ethylene glycol diglycidiyl ether.

Tensile bars were molded from the first example build material composition and the epoxy agent, and tensile bars were molded from the second example build material composition and the epoxy agent. To form the tensile bars, a mixture including the example build material composition and the example epoxy agent was molded at 240° C. in a mini desk injection molding machine. Each mixture included 5 wt % of the epoxy agent (i.e., 5 wt % of the ethylene glycol diglycidiyl ether).

Tensile bars were also molded from the first example build material composition alone without any epoxy agent. These tensile bars were also molded at 240° C. in the mini desk injection molding machine.

The elongation at break, ultimate tensile strength, and Young's Modulus of each of the tensile bars was measured using Instron testing equipment. The values for each of these measurements are shown in Table 1. In Table 1, each tensile bar is identified by the materials (i.e., build material composition and epoxy agent) used to form the tensile bar.

TABLE 1

| Build material composition used to form the tensile bar | Epoxy agent used to form the tensile bar | Elongation at Break (%) | Ultimate Tensile Strength (MPa) | Young's Modulus (MPa) |
|---|---|---|---|---|
| First PA 12 | Example epoxy agent | 33.99 | 70.69 | 1886.81 |
| First PA 12 | Example epoxy agent | 44.62 | 71.17 | 1719.65 |
| Second PA 12 | Example epoxy agent | 30.8 | 85.48 | 1909.29 |
| Second PA 12 | Example epoxy agent | 29.49 | 80.7 | 1809.2 |
| First PA 12 | None | 284.28 | 49.5 | 1838.66 |
| First PA 12 | None | 230.21 | 49.05 | 1779.62 |

As shown in Table 1, the tensile bars formed using the example epoxy agent had higher ultimate tensile strength and lower elongation at break than the tensile bars formed using the example build material composition alone without the example epoxy agent. These results indicate that 3D objects formed by using an example of the epoxy agent disclosed herein have increased ultimate tensile strength and decreased elongation at break as compared to 3D objects formed without the epoxy agent disclosed herein.

Example 2

Another example of the epoxy agent disclosed herein was prepared. The epoxy used in the example epoxy agent was ethylene glycol diglycidiyl ether. The general formulation of the example epoxy agent is shown in Table 2, with the wt % active of each component that was used, based on the total weight of the example epoxy agent.

TABLE 2

| Ingredient | Example epoxy agent (wt %) |
|---|---|
| Epoxy | 45 |
| Co-solvent | 22 |
| Anti-kogation agent | ~0.65 |
| Surfactants | ~1.17 |
| Chelating agent | ~0.07 |
| Biocide | ~0.13 |
| Deionized Water | Balance |

An example of the amine agent disclosed herein was also prepared. The general formulation of the example amine agent is shown in Table 3, with the wt % active of each component that was used, based on the total weight of the example amine agent.

TABLE 3

| Ingredient | Example amine agent (wt %) |
|---|---|
| Amine | 10 |
| Co-solvents | 54 |
| Surfactants | 0.36 |
| Anti-kogation agent | ~0.23 |
| Chelating agent | ~0.02 |
| Biocides | ~0.14 |
| Deionized Water | Balance |

Both of the example epoxy agent and the example amine agent were able to be jetted with via thermal inkjet printing. Thus, both the example epoxy agent and the example amine agent may be selectively applied in the 3D printing methods disclosed herein.

It is to be understood that the ranges provided herein include the stated range and any value or sub-range within the stated range, as if such values or sub-ranges were explicitly recited. For example, from about 5 mPa·s to about 40 mPa·s should be interpreted to include not only the explicitly recited limits of from about 5 mPa·s to about 40 mPa·s, but also to include individual values, such as about 8.5 mPa·s, about 14.67 mPa·s, about 27.0 mPa·s, about 39.75 mPa·s, etc., and sub-ranges, such as from about 4.53 mPa·s to about 22.5 mPa·s, from about 14.25 mPa·s to about 31.2 mPa·s, from about 24.75 mPa·s to about 35.79 mPa·s, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing kit, comprising:

a build material composition including a polyamide having an amino functional group;

an amine agent to be applied to the at least the portion of the build material composition during 3D printing, the amine agent contained separately from the build material composition and consisting of an aqueous liquid vehicle and an amine dissolved or dispersed in the aqueous liquid vehicle, wherein the amine is selected from the group consisting of aniline sulfonamide, dipropylenediamine, diethylaminopropylamine, N-aminoethylpiperazine, bis(2-ethylhexyl)amine, methanediamine, methylphenylenediamine, diaminodiphenylsulfone, and a combination thereof;

an epoxy agent to be applied to at least a portion of the build material composition during 3D printing, the epoxy agent including an epoxy having an epoxide functional group to react with the amino functional group of the polyamide in the at least the portion and the amine in the amine agent; and a fusing agent to be applied to the at least the portion of the build material composition during 3D printing, the fusing agent including an energy absorber.

2. The 3D printing kit as defined in claim 1 wherein the epoxy has a viscosity at 25° C. ranging from about 5 mPa·s to about 140 mPa·s.

3. The 3D printing kit as defined in claim 1 wherein the epoxy is a glycidyl ether.

4. The 3D printing kit as defined in claim 1 wherein the epoxy is selected from the group consisting of 2-ethylhexyl glycidyl ether, phenol (EO) 5 glycidyl ether, p-tert-butylphenyl glycidyl ether, dibromo phenyl glycidyl ether, lauryl alcohol (EO) 15 glycidyl ether, resorcinol diglycidyl ether, neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, and a combination thereof.

5. The 3D printing kit as defined in claim 1 wherein the epoxy is present in an amount ranging from about 5 wt % to about 50 wt %, based on a total weight of the epoxy agent.

6. The 3D printing kit as defined in claim 1 wherein the epoxy agent further includes an aqueous vehicle.

7. The 3D printing kit as defined in claim 1 wherein the epoxy is water-soluble.

8. The 3D printing kit as defined in claim 1 wherein the energy absorber has an average particle size ranging from greater than 0 nm to less than 220 nm.

9. The 3D printing kit as defined in claim 1 wherein the energy absorber is present in an amount ranging from greater than 0 wt % active to about 40 wt % active, based on a total weight of the fusing agent.

10. The 3D printing kit as defined in claim 1 wherein the fusing agent further includes a vehicle comprising a solvent.

11. The 3D printing kit as defined in claim 1 wherein the fusing agent further includes a silane coupling agent.

12. The 3D printing kit as defined in claim 1 wherein the polyamide powder includes polyamide particles having an average particle size ranging from about 2 μm to about 200 μm.

13. The 3D printing kit as defined in claim 1 wherein the build material composition further includes glass dry blended with or encapsulated by the polyamide powder.

14. The 3D printing kit as defined in claim 13 wherein the glass has an average particle size ranging from about 5 μm to about 100 μm.

15. The 3D printing kit as defined in claim 1 wherein the build material composition is dry.

16. The 3D printing kit as defined in claim 1 wherein each of the amine agent, the epoxy agent, and the fusing agent is jettable from an inkjet printhead.

17. The 3D printing kit as defined in claim 1 wherein the epoxy agent is contained separately from the build material composition.

18. A three-dimensional (3D) printing kit, consisting of:

a build material consisting of a polyamide having an amino functional group;

an epoxy agent to be applied to at least a portion of the build material during 3D printing, the epoxy agent including an epoxy having an epoxide functional group to react with the amino functional group of the polyamide in the at least the portion; and a fusing agent to be applied to the at least the portion of the build material during 3D printing, the fusing agent including an energy absorber.

* * * * *